(12) United States Patent  
Bien

(10) Patent No.: US 7,564,275 B2
(45) Date of Patent: Jul. 21, 2009

(54) SWITCHING CIRCUIT AND A METHOD OF DRIVING A LOAD

(75) Inventor: David E. Bien, Glendale, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 320 days.

(21) Appl. No.: 11/450,623

(22) Filed: Jun. 10, 2006

(65) Prior Publication Data

US 2007/0285951 A1    Dec. 13, 2007

(51) Int. Cl.
*H03K 3/00*    (2006.01)
*H02M 3/335*    (2006.01)

(52) U.S. Cl. .......................... 327/109; 327/108; 363/17

(58) Field of Classification Search ............... 363/15, 363/16, 17; 327/108, 109, 132, 214, 215, 327/228, 247, 258, 508, 537, 565, 566, 576, 327/587, 588; 330/250, 252, 263, 264

See application file for complete search history.

(56) References Cited

U.S. PATENT DOCUMENTS

| | | | |
|---|---|---|---|
| 4,126,819 A | 11/1978 | Stobbe et al. | |
| 4,376,267 A * | 3/1983 | Chu et al. | 330/284 |
| 5,493,487 A * | 2/1996 | Close et al. | 363/132 |
| 5,646,837 A | 7/1997 | Weggel | |
| 5,796,276 A * | 8/1998 | Phillips et al. | 327/108 |
| 6,741,115 B2 * | 5/2004 | Lundberg | 327/333 |
| 6,909,620 B2 * | 6/2005 | Park et al. | 363/56.04 |
| 2002/0175719 A1 * | 11/2002 | Cohen | 327/108 |
| 2005/0122180 A1 * | 6/2005 | Khalil | 331/117 FE |
| 2005/0162222 A1 * | 7/2005 | Hezar et al. | 330/10 |
| 2006/0028283 A1 * | 2/2006 | Sze et al. | 331/16 |
| 2007/0018701 A1 * | 1/2007 | Abbasi et al. | 327/157 |

* cited by examiner

*Primary Examiner*—Akm E Ullah
*Assistant Examiner*—M'Baye Diao
(74) *Attorney, Agent, or Firm*—Bryan Cave LLP

(57) ABSTRACT

A switching circuit includes (a) a bridge circuit (122) with a first output (266) to drive a load (130); and (b) a driver circuit (120) comprising a pair of cascode amplifiers (250, 251) receiving complementary inputs and a bias voltage, wherein the driver circuit (120) is electrically coupled to the bridge circuit (122).

18 Claims, 8 Drawing Sheets

SWITCHING CIRCUIT AND A METHOD OF DRIVING A LOAD

FIELD OF THE INVENTION

This invention relates generally to electronics, and relates more particularly to switching circuits.

BACKGROUND OF THE INVENTION

Four transistors in a H-bridge circuit are often used to provide bi-directional drive to load devices, including motors or transducers. Further, totem-pole H-bridge circuits, which use four same-type output transistors, may be preferable in many applications because of the characteristics of available output device types. Totem-pole H-bridge circuits may be particularly advantageous for output devices constructed in integrated circuit form, where process and technology constraints usually preclude creating complementary devices with similar performance characteristics. Additionally, a single pair of transistors, coupled in series, may be used to provide single-ended output power to a load.

In an H-bridge circuit, two transistors are coupled in series between a direct current (DC) voltage source and ground. Thus, if both transistors are turned on simultaneously, a potentially catastrophic shoot-through condition exists in which a short circuit current through the transistors could burn out the transistors or damage other circuit components. To eliminate the potential for shoot-through current in conventional switching circuits, dead time is added to the gate driver signals, provided to the two transistors, to ensure that one of the transistors is completely turned off before the other transistor is turned on. However, the presence of dead time can add a significant amount of undesired non-linearity and harmonic distortion to the pulse width modulated (PWM) output waveform.

Many different methods for compensating for dead time have been proposed, typically by compensating for the effects of dead time indirectly using appropriate control methods to modify the PWM signal timing. Measured phase current polarity information is often required to carry out these compensation algorithms. The very fast (sub-microsecond) time scale for switching in H-bridge circuits, combined with practical difficulties associated with zero-crossing detection errors, has made it difficult to satisfactorily achieve dead time compensation under all conditions, and the added complexity of such approaches also increases the total cost of the circuit.

Various circuits have been proposed for preventing shoot-through currents by effectively sensing current flow through the transistors and ensuring the turn-off of a conducting transistor before the other transistor is turned on. Such circuits require significant additional components, with significant added cost, or still require delays between turn-off and turn-on of the transistors with corresponding dead time in the PWM waveforms.

U.S. Pat. No. 6,909,620 to Park et al. teaches a switching circuit, which provides a turn-on delay of the upper transistors, but requires an extra diode or switch capable of handling a full load current in series with the lower transistors. Park et al.'s design adds extra cost and complexity to the design of the switching circuit and reduces efficiency because of the extra power dissipated by the added sensing element(s).

Accordingly, a need still exists for a simple high-speed switching circuit, which avoids shoot-through currents without excessive dead time.

BRIEF DESCRIPTION OF THE DRAWINGS

The invention will be better understood from a reading of the following detailed description, taken in conjunction with the accompanying figures in the drawings in which.

Figure 1:
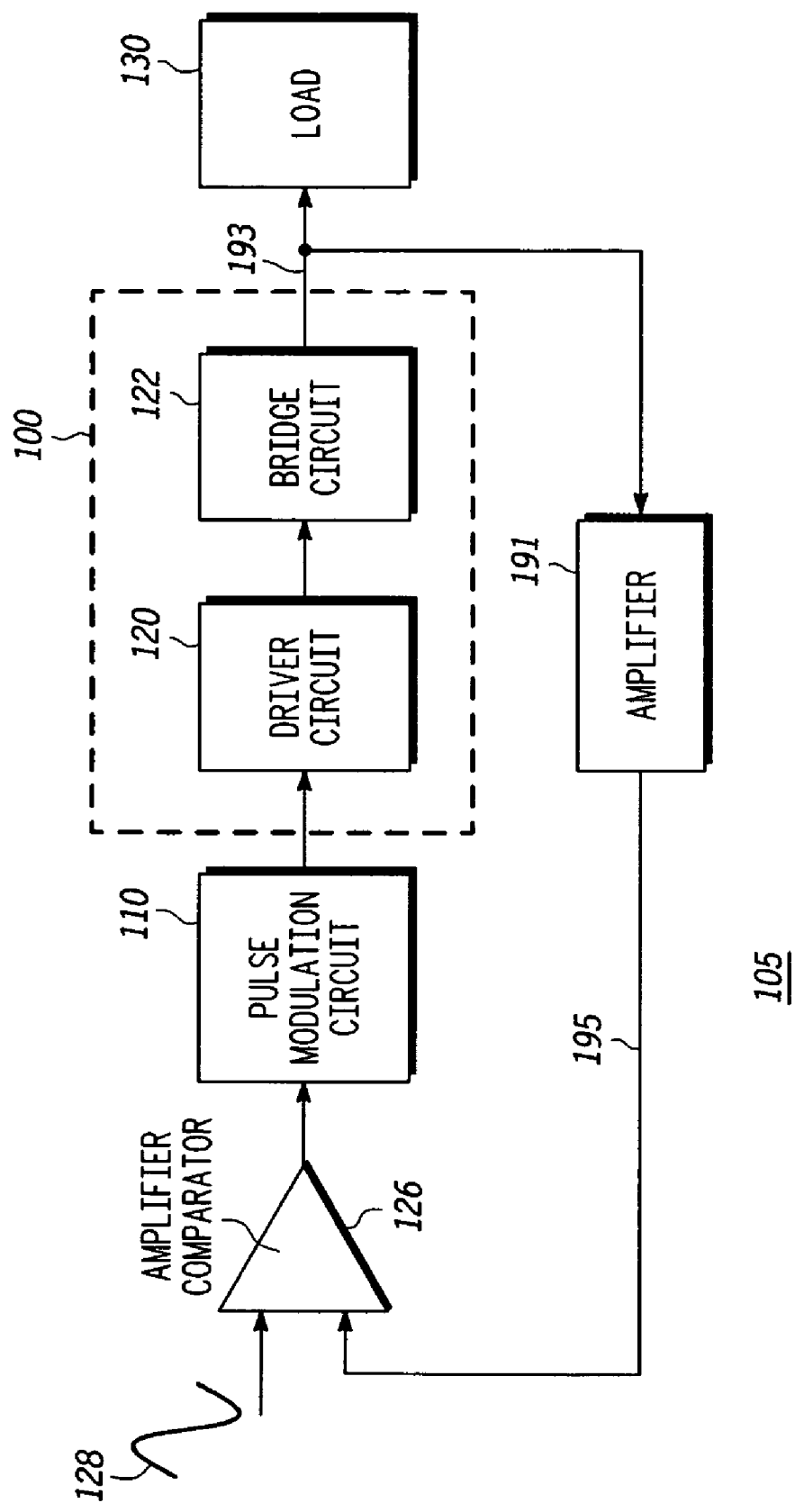
FIG. 1 illustrates a block diagram of a switching amplifier system, which uses an embodiment of the present invention.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Furthermore, the terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus. The term "coupled," as used herein, is defined as directly or indirectly connected in an electrical or non-electrical manner.

DETAILED DESCRIPTION OF THE DRAWINGS

In an embodiment of the invention, a switching circuit includes: (a) a bridge circuit with a first output to drive a load; and (b) a driver circuit comprising a pair of cascode amplifiers receiving complimentary inputs and a bias voltage, wherein the driver circuit is electrically coupled to the bridge circuit.

In another embodiment, a load is driven by the steps of: (a) receiving complimentary input signals and a bias voltage; and (b) based upon the complimentary input signals, using a pair of cascode amplifiers to turn on and off transistors in a bridge circuit to drive the load and to substantially prevent shoot-through current in the bridge circuit.

In a further embodiment, a switching circuit includes three pairs of transistors with a first transistor of each pair electrically coupled in series with a second transistor of each pair, wherein: (a) the first transistor of a first pair of the three pairs of transistors and the first transistor of a second pair of the three pairs of transistors is electrically coupled to a bias voltage; (b) the second transistor of the first pair of the three pairs of transistors is electrically coupled to a first input; (c) the second transistor of the second pair of the three pairs of transistors is electrically coupled to a second input; (d) a first high impendence node electrically couples the first transistor of the second pair of the three pairs of transistors to the first transistor of a third pair of the three pairs of transistors; (e) a first low impedance node is formed between the first transistor of the first pair of the three pairs of transistors and the second transistor of the first pair of the three pairs of transistors; (f) the first low impedance node is electrically coupled to the second transistor in the third pair of the three pairs of transistors; and (g) a first load-driving output node is formed between the first transistor of the third pair of the three pairs of transistors and the second transistor of the third pair of the three pairs of transistors.

FIG. 1 illustrates a block diagram of a switching amplifier system, which uses an embodiment of the present invention. In system 105, an input signal 128 is fed into an input amplifier/comparator 126. The output of amplifier/comparator 126 is input into a pulse modulation circuit 110. Circuit 110 converts the analog output of amplifier/comparator 126 into a digital PWM signal. Input amplifiers and pulse modulation circuits are well-known in the art, and thus, their design and operations are not described in detail herein. The PWM signal is fed into a switching circuit 100, which includes a driver circuit 120 and a bridge circuit 122. Circuit 100 converts the digital PWM signal into an AC power signal 193 (i.e. output signal) used to drive a load 130.

In the same or different embodiment, signal 193 can be fed back to an input of amplifier 191 to allow performance improvements that can be implemented using a feedback approach, such as reduced distortion. To include feedback in system 105, the output signal 193 is directed to amplifier 191, whose purpose is to modify the characteristics of signal 193 such that the resulting signal may be compared to signal 193 by amplifier/comparator 126. In this case, amplifier/comparator 126 will be a differencing amplifier amplifying the difference between signal 128 and the feedback signal. Usually, amplifier 191 has some combination of scaling and filtering functions used to condition the observed output signal, often to reduce the amplitude of signal 193 and remove any unwanted frequency content so that signal 128 can be compared to the feedback signal and produce an accurate result. The exact characteristics of amplifier 191 will depend on the characteristics of the components of amplifier 191 as well as the desired results. System 105 is capable of operating with or without feedback and system 105 is substantially unchanged whether feedback is present or not. In some embodiments, one or more of the elements of system 105 can use a power-up circuit to begin operations.

Figure 2:
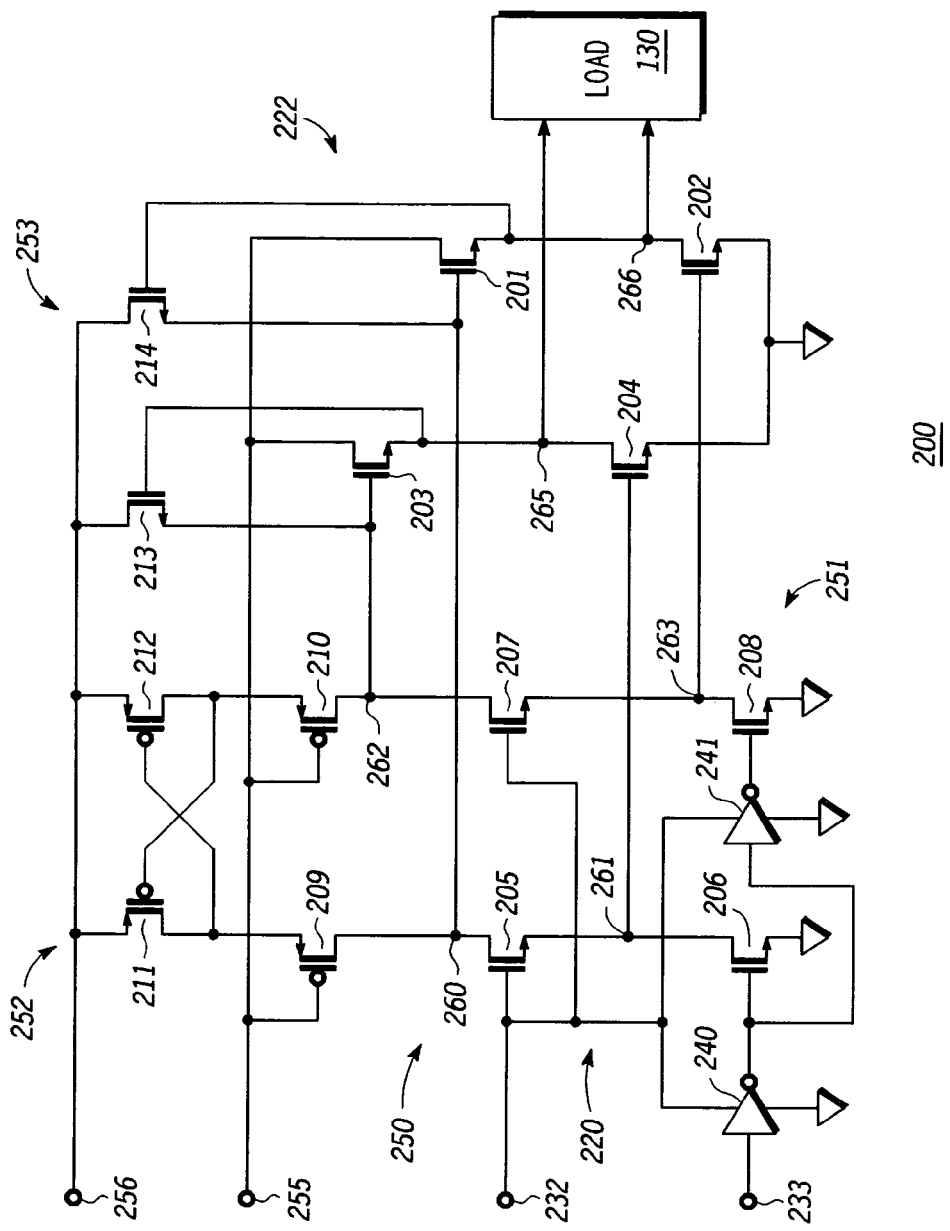
FIG. 2 illustrates a schematic diagram of a first switching circuit according to a first embodiment of the present invention.

FIG. 2 illustrates a schematic of a first switching circuit 200 according to a first embodiment of the present invention. As an example, in FIG. 2, circuit 200 includes a driver circuit 220 along with a bridge circuit 222. Circuits 220 and 222 can be used for circuit 120 and circuit 122, respectively, in FIG. 1.

In one embodiment, circuit 222 is a H-bridge circuit and includes four transistors 201, 202, 203, and 204, which are alternately turned on and off in a selected switching sequence to provide AC power to a load 130. Transistors 201 and 202 are coupled in series with transistor 201 coupled to a supply voltage at a node 255 and transistor 202 coupled to ground. Transistors 203 and 204 are coupled in series with transistor 203 coupled to a supply voltage at node 255 and transistor 204 coupled to ground. A load-driving output node 265 is formed between transistors 203 and 204. A load-driving output node 266 is formed between transistors 201 and 202.

In one embodiment, the transistors 201, 202, 203, and 204 are in a totem-pole configuration and are n-type MOSFETs (metal-oxide-semiconductor field effect transistors). A totem-pole configuration is a configuration where transistors 201, 202, 203, and 204 are the same type of transistor. In many semiconductor manufacturing technologies, one type of transistor has better performance than the other, due to the nature of the manufacturing process and the materials involved, and in many cases n-type transistors are preferred because of their superior switching characteristics and low on-resistance compared to p-type transistors. In other embodiments, p-type transistors can be used or circuit 222 also can be adapted to complementary output stages where both types of transistors are used.

In operation, transistors 201 and 204 supply load 130 with a voltage in one direction. The transistors 201 and 204, then, are turned off, and transistors 202 and 203 are turned on to apply a voltage in the opposite direction to load 130. If transistors 201 and 202, or 203 and 204, are simultaneous turned on, shoot-through current will run from the voltage source at node 255 to ground. Circuit 220 provides the appropriate gate signals for all four transistors 201, 202, 203, and 204 to prevent shoot-through current.

As an example, circuit 220 includes a pair of cascode amplifiers 250 and 251. Amplifiers 250 and 251 receive complementary inputs from inverters 240 and 241, respectively. Amplifier 250 includes of a pair of transistors 205 and 206 electrically coupled in series with each other. Amplifier 251 includes a pair of transistors 207 and 208 electrically coupled in series with each other. The gates of transistors 205 and 207 are coupled to a bias voltage 232, e.g. a cascode reference voltage. A high impendence node 262 electrically couples transistor 207 to the gate of transistor 203. A high impendence node 260 electrically couples transistor 205 to the gate of transistor 201. A low impedance node 263 is located between transistors 207 and 208 and is electrically coupled to the gate of transistor 202. A low impedance node 261 is located between transistors 205 and 206 and is electrically coupled to the gate of transistor 204.

In one embodiment, each pair of transistors 205 and 207, and 206 and 208 are matched transistors i.e. transistor 205 is matched to transistor 207, and transistor 206 is matched to transistor 208; that is, the pair of transistors of transistors 205 and 207, and 206 and 208 are placed in close proximity and with like orientation, or other techniques may be employed to take advantage of the simultaneous formation of the transistors during manufacture so that the individual transistors in each matched pair have nearly identical electrical performance and characteristics.

For circuit 200 to function optimally and prevent shoot-through currents as desired, the bias voltage 232 is set and the device sizes of transistors 202, 204, 205, 206, 207, and 208 are chosen such that transistors 202 and 204 do not conduct significant current during the switching time when the gate-to-source voltages of transistors 202 and 204 are equal. This condition ensures that both transistors 201 and 202, or 203 and 204 do not conduct simultaneously and, thus, shoot-through currents are prevented. However, when the switching transition has been completed such that one transistor, for example, transistor 204 is conducting and transistor 202 is not conducting, the $V_{GS}$ (gate to source voltage) for transistor 204 established by the bias at node 232 acting through transistor 205 is sufficiently large to ensure that transistor 204 conducts fully with a low RDSon (drain to source resistance when the transistor is on). In a similar way, the $V_{GS}$ for transistor 202 when conducting should be large enough to produce a low RDSon. These conditions are achieved simultaneously by adjusting the bias voltage at node 232 and the sizes of transistors 205, 206, 207, and 208 relative to the sizes of transistors 202 and 204. In one embodiment, the adjustment of sizes is facilitated and transistors 202, 204, 205, 206, 207, and 208 have similar construction because transistors 202, 204, 205, 206, 207, and 208 are fabricated simultaneously in an integrated circuit.

An active load circuit 252 is electrically coupled to amplifiers 250 and 251 through transistors 209 and 210, respectively. Circuit 252 includes a pair of cross-coupled transistors 211 and 212. Node 255 provides a supply voltage to circuit 200, and a node 256 provides a charge pump voltage to circuit 200.

In one embodiment, circuit 200 also includes a switch protection circuit 253 electrically coupled to circuit 222. Circuit 253 is an active clamp device comprising transistors 213 and 214. Circuit 253 protects transistors 201 and 203 from high negative gate to source voltages, which can occur when loan 130 is a highly inductive load. Circuit 253 is not necessary to operate the circuit 200, but may be included if needed for the specific load that is electrically coupled to circuit 200.

When a digital PWM signal is applied to an input node 233, complementary versions of the signal are applied to the gates of transistors 206 and 208 by inverters 240 and 241, respectively. A high signal at input node 233 turns transistor 206 off and transistor 208 on. With transistor 208 on, the voltage at the gates of transistors 202 and 203 are near ground, and these transistors are off. The gate of transistor 211 is also pulled low by the source of transistor 210, such that transistor 211 is on and the gates of transistors 201 and 204 are pulled high, allowing current to flow to load 130 from node 266. The gate voltage of transistor 204 can be no higher than the bias voltage supplied at node 232 minus the threshold voltage of transistor 205, while the gate voltage of transistor 201 is pulled to the high-side gate drive voltage.

As the state of the input at input node 233 is changed, the states of transistor 206 and transistor 208 are reversed. Transistor 206 pulls the gates of transistors 201 and 204 low and, thus, turns transistors 201 and 204 off and turns transistor 212 on. Transistor 212 can pull the gates of transistor 202 and 203 high. However, because transistor 212 will not change states until the voltages on the gates of transistors 201 and 204 have dropped significantly, transistor 212 cannot begin turning transistors 202 and 203 on while transistors 201 and 204 are still on. Similarly, when changing states in the other direction, transistor 211 cannot turn transistors 201 and 204 on while transistors 202 and 203 are still on.

The operation of circuit 200, as described above, was verified by computer simulation. A DC sweep of the input voltage at the gate of transistor 206 along with a complementary voltage sweep at the gate of transistor 208 verified that no intermediate states exist that permit shoot-through current in circuit 200.

Figure 3:
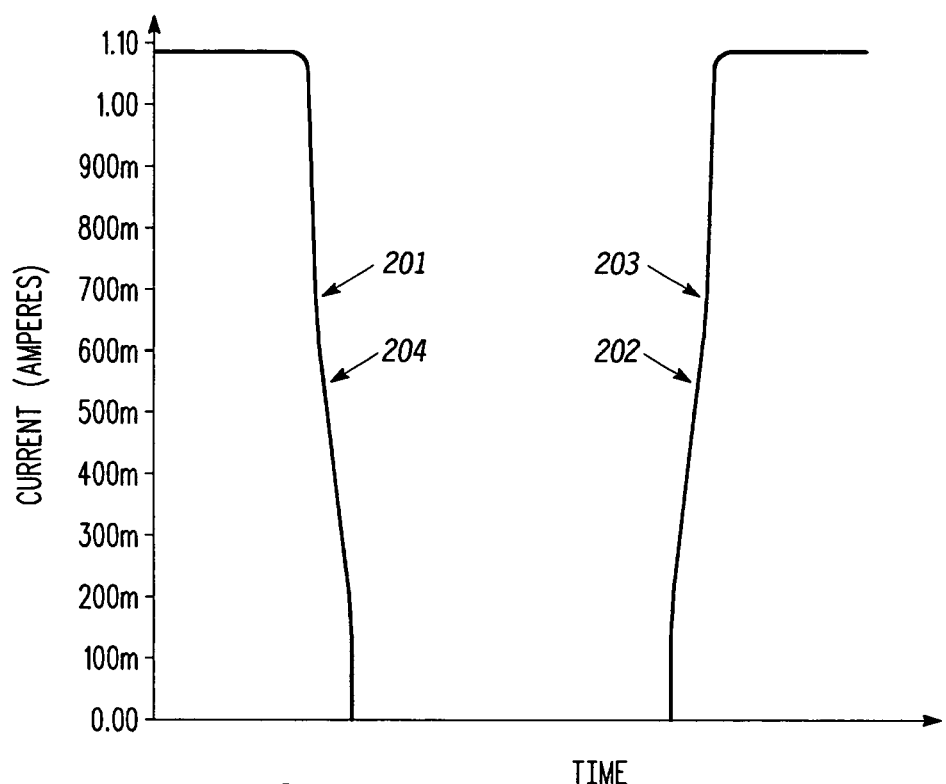
FIG. 3 is a graph illustrating the current flowing in the transistors of the bridge circuit of FIG. 2 versus the input voltage to the driver circuit of FIG. 2 as it is varied over an input voltage range.

FIG. 3 is a graph illustrating the current flowing in transistors 201, 202, 203, and 204 in FIG. 2 versus the input voltage at the gate of transistor 206 in the sweep condition described above. FIG. 3 shows that regardless of the input voltage to circuit 200 in FIG. 2, current that flows in transistor 201 also flows in transistor 204, and current that flows in transistor 203 also flows in transistor 202. This computer simulation verifies that all current is flowing through the load 130, and any shoot-through current is insignificant.

Figure 4:
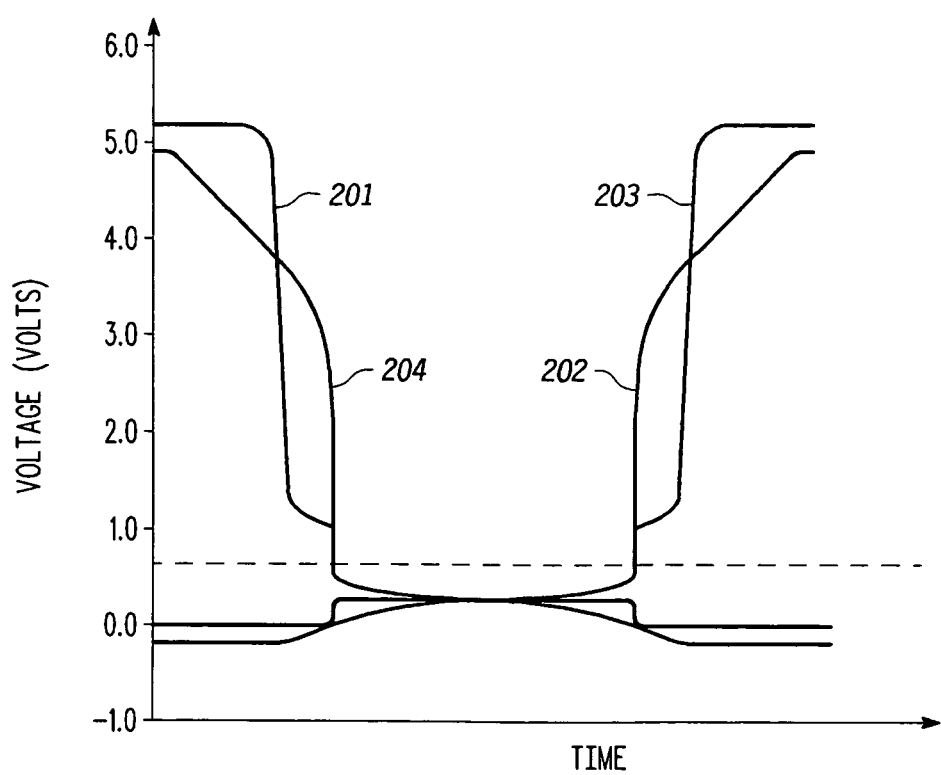
FIG. 4 is a graph illustrating the gate-to-source voltage of each of the transistors of the bridge circuit of FIG. 2 versus the input voltage to the driver circuit of FIG. 2 as it is varied over the input voltage range.

FIG. 4 is a graph illustrating the $V_{GS}$ of each of transistors 201, 202, 203, and 204 in FIG. 2 versus the input voltage at the gate of transistor 206 in the sweep condition described above. FIG. 4 shows that as the input voltage changes, load 130 in FIGS. 1 and 2 will see a significant reduction in the gate to source voltage of transistors 201 and 204 and effectively reduce the current to a negligible level, before transistors 202 and 203 undergo an increase in gate to source voltage and begin conducting.

Figure 5:
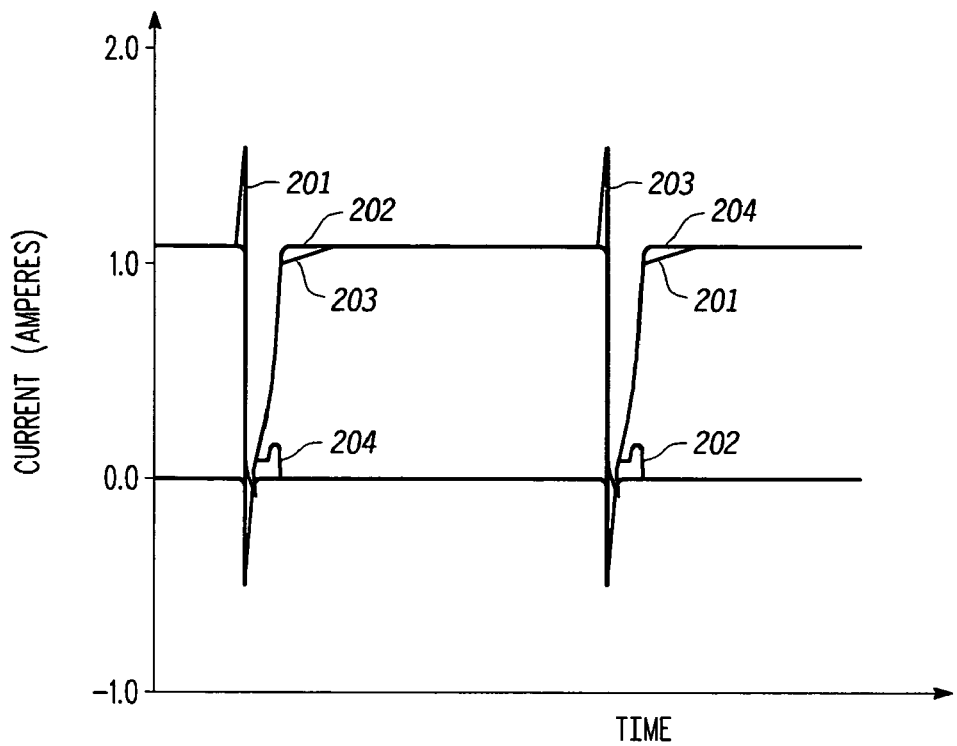
FIG. 5 is a graph illustrating the current in each of the transistors of the bridge circuit of FIG. 2 versus time.

Simulations were also performed to evaluate the currents in circuit 222 of FIG. 2 under dynamic conditions. FIG. 5 is graph of time versus current for each of transistors 201, 202, 203, and 204 in FIG. 2. FIG. 5 shows that, even at high switching speeds, there is no indication of shoot-through current. The sharp current spikes are currents caused by rapid charging of the parasitic capacitance of the transistors 210, 202, 203, and 204, but do not represent shoot-through currents due to transistor conduction.

In a non-illustrated embodiment, circuit 200, as shown in FIG. 2, can be modified to operate with other output stages, such as a complementary H-bridge or a complementary push-pull output stage device. As an example, in the complementary H-bridge circuit, circuit 200 will be configured such that transistors 201 and 203 are p-channel device, while transistors 202 and 204 are n-channel devices. The difference in transistor polarity requires some changes in circuit 200. In this embodiment, the charge pump voltage at node 256 must be more positive than the voltage at node 255, which is no longer required to switch transistors 201 and 203. Therefore, the voltage at node 256 becomes the main supply voltage, and is now the most positive voltage in the circuit 200, and node 255 becomes a reference voltage for the gates of transistors 209 and 210.

Circuit 253 can be removed, but suitable protection can be included if needed. The couplings for transistor 201 is modified such that the drain of transistor 201 couples to the load at node 266, the source of transistor 201 couples to the main supply at node 256, the gate of transistor 201 is coupled to the source of transistor 210 and the gate of transistor 211. The couplings for transistor 203 is changed such that the drain of transistor 203 couples to the load at node 265, the source of transistor 203 couples to the main supply at node 256, and the gate of transistor 203 is coupled to the node at the source of transistor 209 and the gate of transistor 212 in this embodiment For this configuration, preferably transistors 209, 210, 211, and 212 have similar performance characteristics to transistor 201 and 203, and the reference voltage at node 255 is chosen to accommodate the characteristics of transistors 209, 210, 211, and 212.

Figure 6:
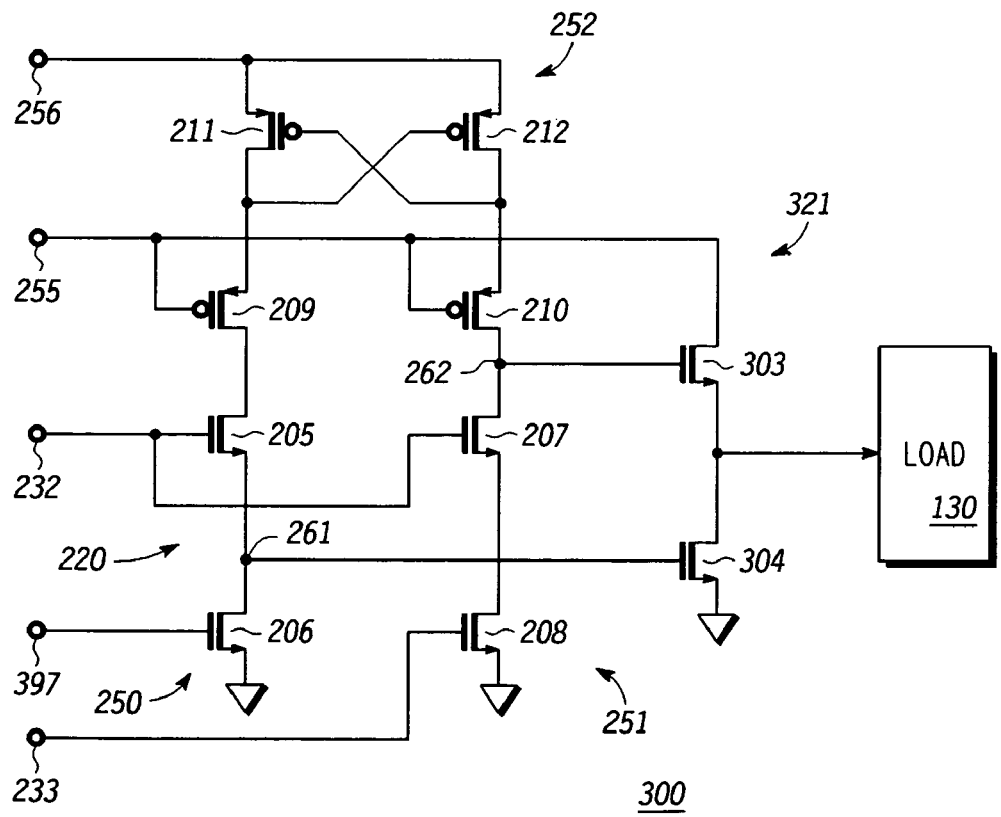
FIG. 6 illustrates a schematic diagram of a second switching circuit according to a second embodiment of the present invention.

FIG. 6 illustrates a schematic diagram of second switching circuit according to a second embodiment of the present invention. As an example, in FIG. 6, a switching circuit 300 includes a driver circuit 220 along with a circuit 321. Circuit 321 is a T-bridge circuit and can also be referred to as a single-ended output stage device.

In one embodiment, circuit 321 includes two transistors 303 and 304 coupled in series with each other. Circuit 321 provides single phase power to load 130. The transistors 303 and 304 are driven in similar manner to transistors 203 and 204 of FIG. 2. The signals received at input node 233 and 397 in FIG. 3 are complementary version of the same input signal. In this embodiment, circuit 220 prevents transistors 303 and 304 from simultaneously being turned on and, thus, eliminates shoot-through current from flowing from node 255 to ground.

Figure 7:
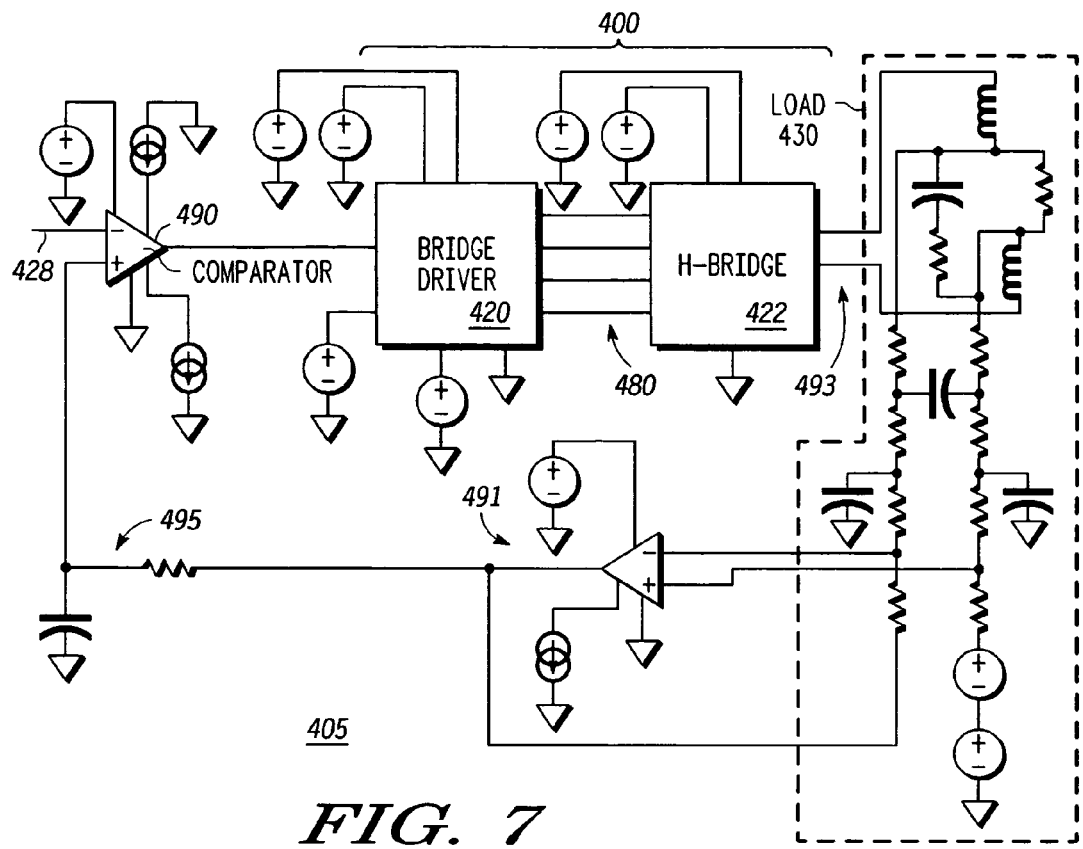
FIG. 7 illustrates a block diagram of an audio amplification circuit in accordance with another embodiment of the present invention.

FIG. 7 illustrates a block diagram of an audio amplification circuit 405, which uses a switching circuit 400 in accordance with another embodiment of the present invention. Switching circuit 400 includes a driver circuit 420 coupled to a bridge circuit 422. A comparator 490 is coupled to circuit 420, and a load 430 is coupled to circuit 422. Circuit 405 takes a single-ended audio input 428 at comparator 490 and provides a switched differential output 493 at circuit 422 to drive a load 430, which includes a speaker and an appropriate filter network Output 493 at load 430 is feedback through differential amplifier 491, and feedback signal 495 is monitored and compared against input 428 by comparator 490.

Figure 8:
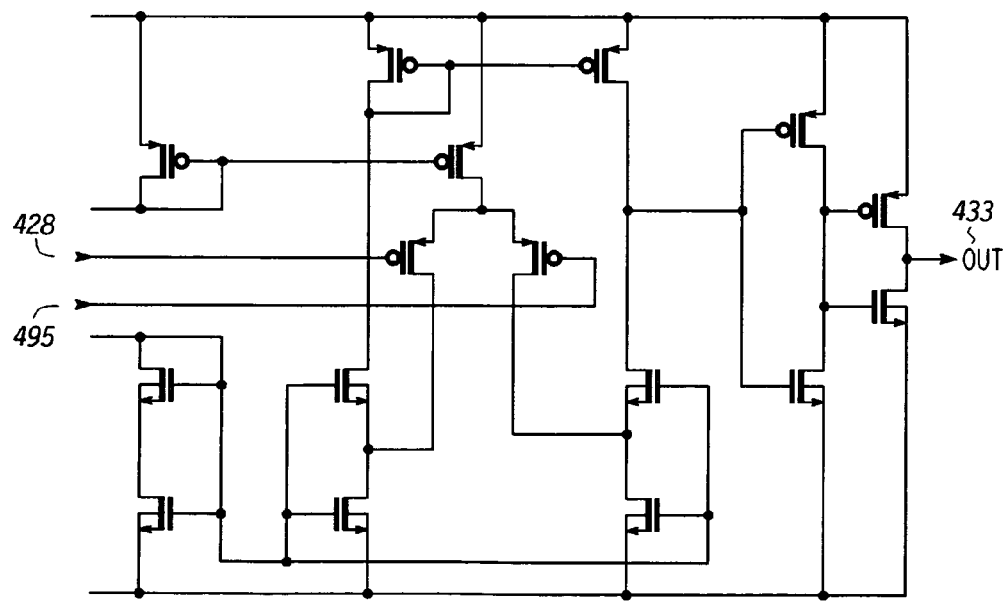
FIG. 8 illustrates schematic diagram of a PWM comparator of the audio amplification circuit of FIG. 7.

FIG. 8 illustrates a schematic diagram of comparator 490 of FIG. 7. Comparator 490 is a CMOS (complementary metal-oxide semiconductor) comparator operating from a 5 volts (V) supply. Comparator 490 produces a PWM output signal 433 by comparing a triangle wave of input 428 to signal 495 from the output of amplifier 491.

As an example, the triangle wave frequency at input 428 can be set at 400 kilohertz (KHz), with a DC value of 2 V and an amplitude of 1.6 V. One skilled in the art will understand that when signal 495 is also at 2 V, comparator 490 outputs a signal 433 at 400 KHz, with a 50% duty cycle. Although the output is switching at 400 kHz, and an AC voltage is present at load 430 because of the switching frequency and harmonics, load 430 only responds to a DC voltage and relatively low frequency audio band signals and the remainder is filtered out. A 50% duty cycle applied to the output where ideal and symmetrical switching would produce a steady state load current of 0 amperes (A). Computer simulations show that a load current of just a few milliamps occurs in this situation, suggesting that switching-induced offsets are small.

Figure 9:
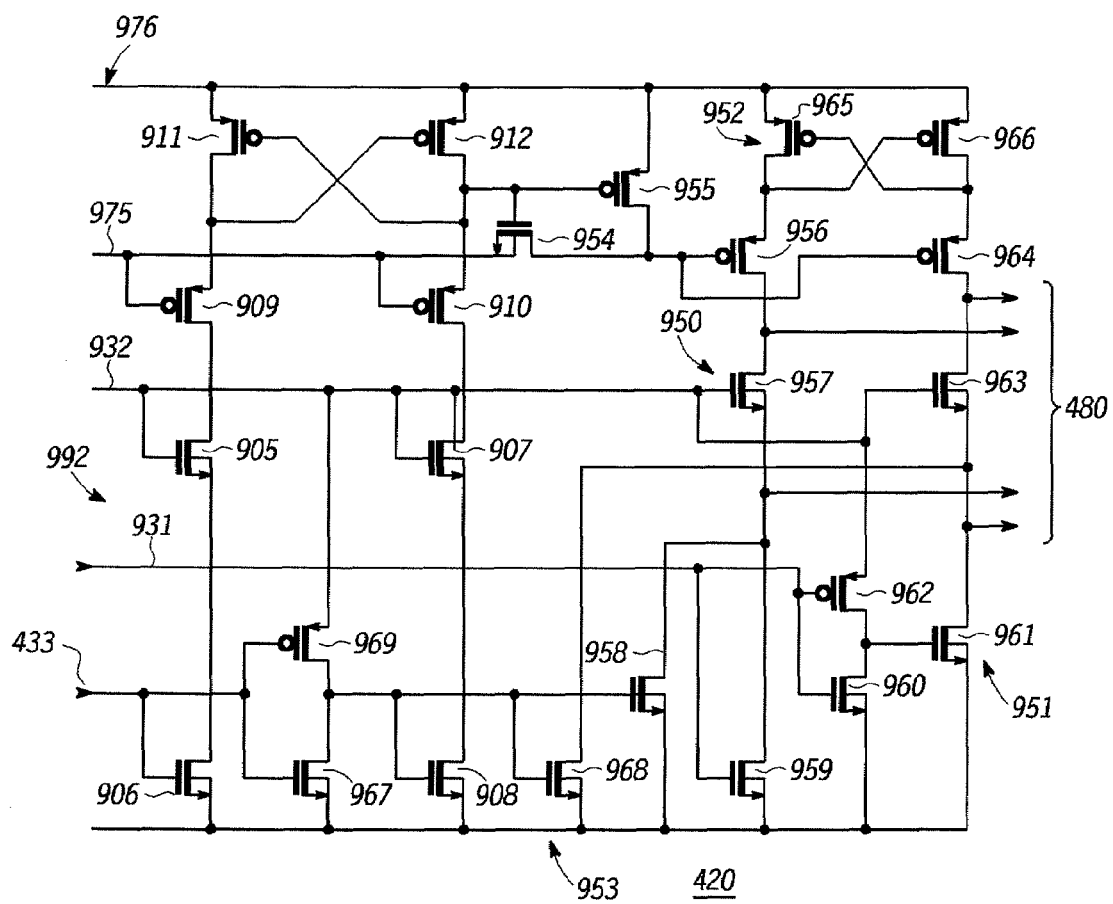
FIG. 9 illustrates schematic diagram of a driver circuit in accordance with the embodiment of the present invention used in the audio amplification circuit of FIG. 7.
Figure 10:
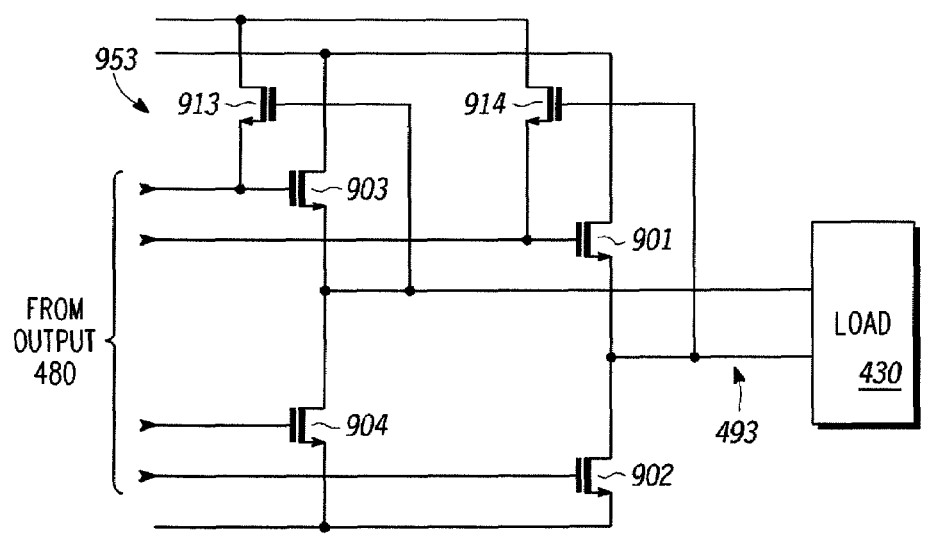
FIG. 10 illustrates schematic diagram of a bridge circuit in accordance with the embodiment of the present invention used in the audio amplification circuit of FIG. 7.

FIG. 9 illustrates circuit 420, used in circuit 405 of FIG. 7, in accordance with an embodiment of the present invention. FIG. 10 illustrates circuit 422, used in circuit 405 of FIG. 7, in accordance with an embodiment of the present invention.

Circuit 420 of FIG. 9 includes transistors 905, 906, 907, 908, 909, 910, 911, 912, 954, 955, 956, 957, 958, 959, 960, 961, 962, 963, 964, 965, 966, 967, 968, and 969. Transistors 956, 957, 959, 960, 961, 962, 963, 964, 965, and 966 are a driver circuit providing gate control signals 480 to circuit 422 of FIG. 10. in circuit 420, transistors 959 and 957 form a cascode amplifier 950 that receives a digital pulse control signal 931 Transistors 960 and 962 form an inverter to invert signal 931. Transistors 961 and 963 form a cascode amplifier 951 that receives the inverted version of signal 931.

The outputs cascode amplifiers 950 and 951 are coupled to each other through a cascode active load circuit 952, composed of transistors 956, 964, 965, and 966. In circuit 420, transistor 956 is connected as a cascode device for transistor 965, and transistor 964 is connected as a cascode device for transistor 966. The remaining transistors in circuit 420 provide a direct means of disabling switching of all output devices driving the load with a digital control. To achieve this function, signal 433 is an enable signal, such that a high logic level enables normal switching operation. Transistors 967 and 969 form an inverter to invert signal 433, and transistors 958 and 968 receive this inverted signal and act as switches to pull the lower outputs in transistor 908 low (and turn off transistors 904 and 902 in FIG. 10) when signal 433 is at logic low. Transistors 954 and 955 act as switches to tie the gates of transistors 956 and 964 to the desired reference signal 975 for normal operation, but connect the gates to charge pump supply 976 when enable signal 433 is low (thus disabling the active load and uncoupling cascode amplifiers 950 and 951). Transistors 905 through 912 provide four gate drive signals to transistors 901, 902, 903, and 904 (FIG. 10) based on signal 931. Transistors 905 through 912 can be described in a similar manner to transistors 956, 957, 959, 961, 963, 964, 965, and 966, but transistors 905 through 912 act to provide a control signal based on signal 433 to transistors 954 and 955 to disable switching of all output devices.

Transistors 906 and 905 form a cascode amplifier 992 that receives as an input an enable signal 433. Transistors 908 and 907 form a cascode amplifier 953 that receives as an input the inverted version of the enable signal provided by transistors 967 and 969. Transistors 909 though 912 form a cascode active load coupled to the outputs of the cascode amplifiers 952 and 953, where transistors 911 and 912 form an active load with cross-coupled gates, transistor 909 is connected as a cascode transistor for transistor 911, and transistor 910 is connected as a cascode transistor for transistor 912.

Circuit 420 takes the 0-5 V digital signal 433 from the output of comparator 490 of FIG. 7 and creates the necessary voltages 480 to drive the gates of four transistors 901, 902, 903, and 904 in circuit 422. As an example, transistors 901, 902, 903, and 904 are similar to transistors 201, 202, 203, and 204, respectively, in FIG. 2, and in general, circuit 400 can be similar to circuit 200 in FIG. 2. The function of the circuit 400 is to switch transistors 901, 902, 903, and 904 precisely and minimize shoot through currents that would result from transistors 901 and 902 conducting simultaneously with each other and transistors 903 and 904 conducting simultaneously with each other. The topology of circuit 420 allows rapid switching of transistors 901, 902, 903, and 904, but permits little shoot-through current. Provisions are made to tri-state all of transistors 901, 902, 903, and 904 with a digital signal. This topology provides the correct gate driver signals from relatively simple circuitry.

Each of the four transistors 901, 902, 903, and 904 has an on-resistance of about 160 milliohms at a gate to source voltage of 5 V. Transistors 901 and 903 are protected against gate breakdown by the addition of an optional switch protection circuit 953. Circuit 953 includes two transistors 913 and 914, which supply additional current to hold the gate of either transistor 901 or 903 high in the event the source of that transistors is held high while circuit 420 is attempting to turn transistors 901 or 903 off. This configuration effectively creates a small delay in the turnoff of transistors 901 and 903 to protect transistors 901 and 903. With an audio signal applied to the input of circuit 400, the duty cycle of the signal at output 493 is adjusted so that the output voltage at output 493 to load 430 is a replica of the audio input at input 428.

Figure 11:
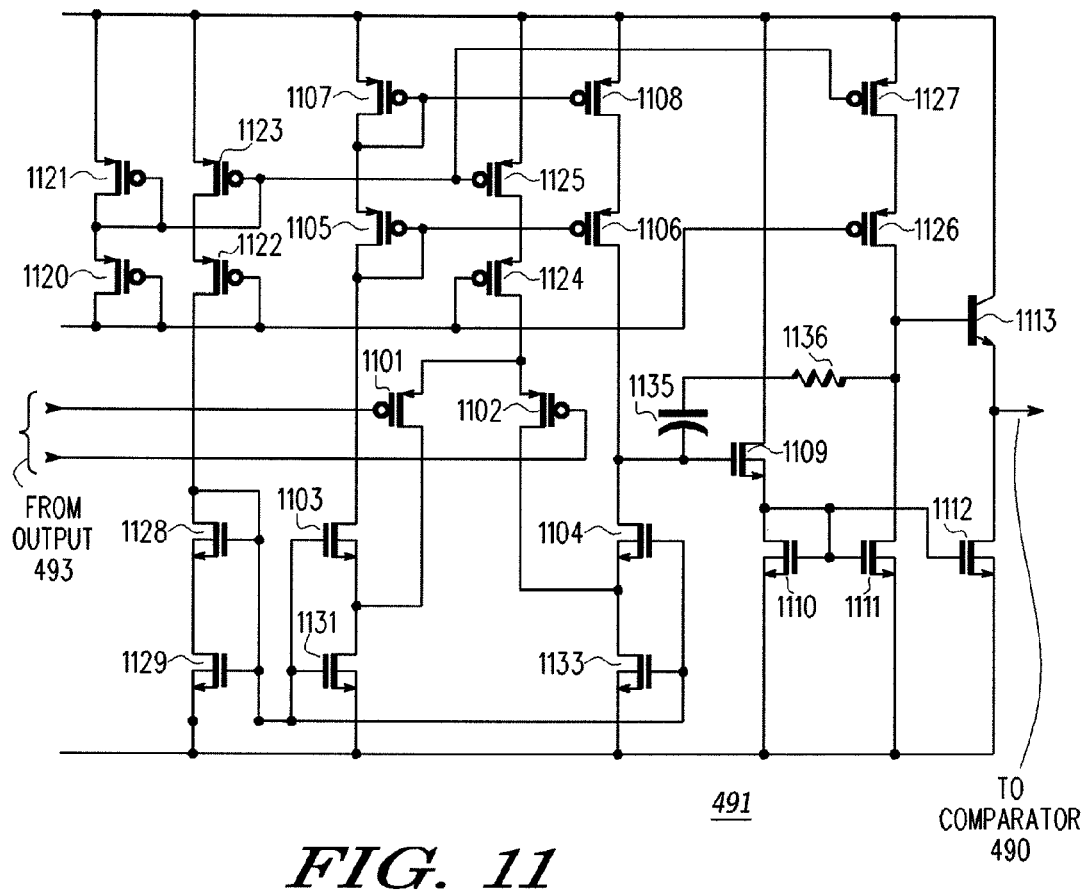
FIG. 11 illustrates a schematic diagram of an input amplifier of the audio amplification circuit of FIG. 7.

FIG. 11 illustrates a schematic diagram of a CMOS input amplifier 491 of circuit 405 in FIG. 7. Amplifier 491 is used to monitor the output voltage at output 493. Amplifier 491 has a DC gain in excess of 110 decibels (dB) and a gain-bandwidth product of about 9 megahertz (MHz). Quiescent current is roughly 600 microamperes (uA).

As illustrated in FIG. 11, circuit 491 can include capacitor 1135, resistor 1136, and transistors 1101, 1102, 1103, 1104, 1105, 1106, 1107, 1108, 1109, 1110, 1111, 1112, 1113, 1120, 1121, 1122, 1123, 1124, 1125, 1126, 1127, 1128, 1129, 1131 and 1133. Capacitor 1135 and resistor 1136 can adjust the frequency characteristics of the comparator 490 (FIG. 7) as may be needed to stabilize the feedback loop of which the comparator 490 (FIG. 7) is a part.

Transistors 1101 and 1102 can constitute a differential input pair for receiving a differential input signal. The gate of transistor 1102 is the positive input, and the gate of transistor 1101 is the negative input, such that a positive differential voltage at the inputs produces a positive voltage at the output node. Transistors 1103 and 1104 can act as cascode transistors for transistors 1101 and 1102, respectively, so that the resulting differential current in transistors 1101 and 1102 is effectively applied to the active load formed by transistors 1105, 1106, 1107, and 1108. Thus, transistors 1101, 1102, 1103, 1104, 1105, 1106, 1107, and 1108 can form the first voltage gain stage that produces an amplified version of the differential input signal at the high-impedance node present at the connection of the drains of transistors 1104 and 1106.

The second gain stage can be formed by transistors 1109, 1110, 1111, 1126 and 1127. The second gain stage takes its input at the gate of transistor 1109, and the output node can be the connection at the drains of transistors 1111 and 1126. Capacitor 1135 and resistor 1136 can adjust the frequency response of the second gain stage (and therefore the complete amplifier) as may be needed to achieve stable operation of the feedback loop. Transistors 1112 and 1113 can form a totem-pole-style push-pull output stage with an output node that is the connection of the drain of transistors 1112 and the emitter of transistors 1113.

Transistors 1112, 1113, 1120, 1121, 1122, 1123, 1124, 1125, 1128, 1129, 1131,and 1133 provide biasing to implement current sources needed for circuit operation. A reference current source or other current path is attached to the drain and gate of transistor 1120 to complete the circuit bias, along with the necessary connections for power supply and ground.

Figure 12:
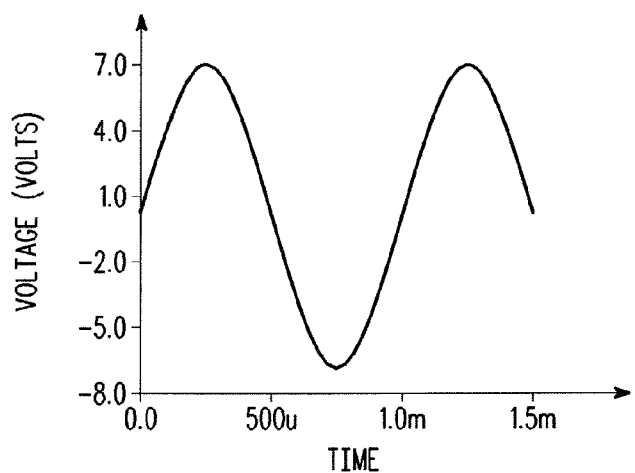
FIG. 12 is a graph showing an example of an output load voltage from the audio amplification circuit of FIG. 7.

FIG. 12 is a graph showing an example of an output load voltage from audio amplification circuit 405 of FIG. 7. Specifically, FIG. 11 shows the output load voltage resulting from a 3 V peak, 1 kilohertz (KHz) input, based on a computer simulation of comparator 490. The output is 2.92 W (watts) rms (root mean squared) into 8 ohms. The 3V peak, 1 KHz input signal represents a low-power signal because the impedance level at the amplifier input is high. The input signal has been amplified to an approximate 7V peak signal delivered to an 8 ohm load, so that the power is 2.92 W rms. THD (total harmonic distortion) is estimated to be below 0.001%. THD is a measure of distortion that relates the total power in the harmonics of the input signal (2 KHz, 3 KHz, 4 KHz, etc.) to the output power of the fundamental (1 KHz). A distortionless amplifier would have all power contained in the fundamental so THD would be zero percent. Distortion may also be present from added non-harmonically related signals, such as the 400 KHz switching. The 400 KHz switching frequency is present at a level of 3.1 milli-Watts (mW).

Circuit 405 is suitable for implementing a switching audio amplifier (Class D). Results of simulation of the audio amplification circuit 405 show relatively low distortion levels (<0.001% THD) and flat response in the audio band. The predicted efficiency is near 85% at 3 W output with low distortion.

Figure 13:
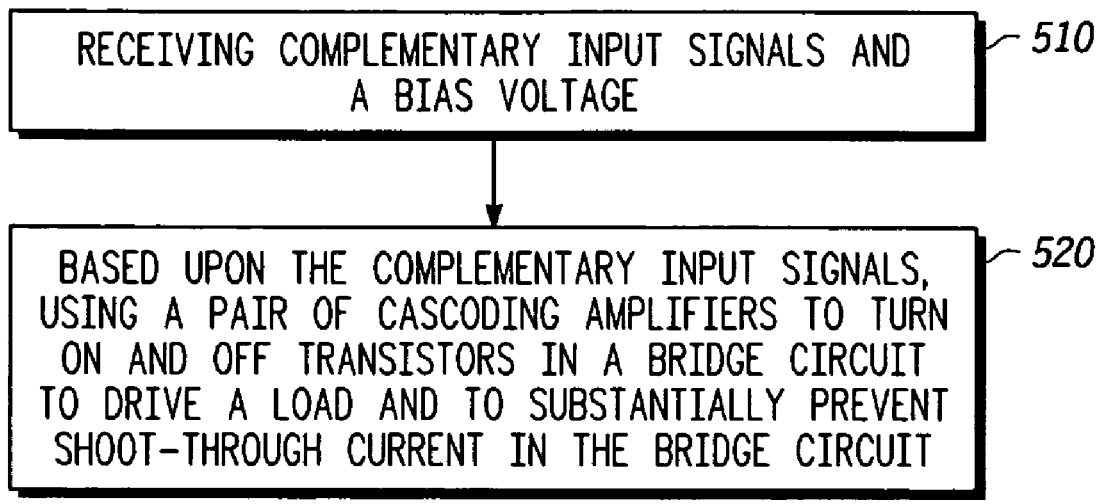
FIG. 13 is a flow chart of a method of driving a load in accordance with an embodiment of the present invention.

FIG. 13 is a flow-chart of a method of driving a load in accordance with an embodiment of the present invention. Flow chart 500 includes a step 510 of receiving complementary input signals and a bias voltage. For example, the complementary input signals and bias voltage of step 510 can be received by a pair of cascode amplifiers similar to cascode amplifiers 250 and 251, shown in FIG. 2.

Flow chart 500 in FIG. 13 continues with a step 520 of, based upon the complementary input signals, using a pair of cascode amplifiers to turn on and off transistors in a bridge circuit to drive a load and to substantially prevent shoot-through current in the bridge circuit. As an example, the bridge circuit of step 520 can be similar to bridge circuit 222, 321, or 422 in FIGS. 2, 6, and 10, respectively.

Although the invention has been described with reference to specific embodiments, it will be understood by those skilled in the art that various changes may be made without departing from the spirit or scope of the invention. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that other types of transistors may be used in a variety of embodiments, and that the foregoing discussion of certain of these embodiments does not necessarily represent a complete description of all possible embodiments. As another example, in a different embodiment, the multiphase inverter with three or more legs may replace the H-bridge circuit or the single leg inverter.

Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims. Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A switching circuit comprising:
   a bridge circuit with a first output to drive a load;
   a driver circuit comprising a pair of cascode amplifiers receiving complementary inputs and a bias voltage; and
   a switch protection circuit electrically coupled to the bridge circuit,
   wherein the driver circuit is electrically coupled to the bridge circuit.

2. The switching circuit of claim 1, wherein:
   the bridge circuit is a H-bridge circuit.

3. The switching circuit of claim 1, wherein the first output of the bridge circuit supplies an alternating current voltage to the load.

4. A switching circuit comprising:
   a bridge circuit with a first output to drive a load; and
   a driver circuit comprising a pair of cascode amplifiers receiving complementary inputs and a bias voltage,
   wherein the driver circuit is electrically coupled to the bridge circuit; and the driver circuit further comprises an active load circuit electrically coupled to the pair of cascade amplifiers.

5. The switching circuit of claim 4, wherein:
the active load circuit comprises a pair of cross-coupled transistors.

6. The switching circuit of claim 1, wherein:
each of the cascode amplifiers in the pair of cascode amplifiers comprises a first transistor and a second transistor coupled in series with the first transistor.

7. The switching circuit of claim 6, wherein:
the first transistor in a first one of the pair of cascode amplifiers has substantially the same electrical performance characteristics as the first transistor in a second one of the pair of cascode amplifiers.

8. The switching circuit of claim 7, wherein:
the second transistor in a first one of the pair of cascode amplifiers has substantially the same electrical performance characteristics as the second transistors in a second one of the pair of cascode amplifiers.

9. The switching circuit of claim 6, wherein:
a first node is located between the first transistor of a first one of the pair of cascode amplifiers and the second transistor of the first one of the pair of cascode amplifiers, and
the first node is electrically coupled to an input of the bridge circuit.

10. The switching circuit of claim 1, wherein:
the bridge circuit is a T-bridge circuit.

11. The switching circuit of claim 1, wherein:
the switching protection circuit is an active clamp circuit.

12. The switching circuit of claim 1, wherein:
the combination of the bridge circuit and the driver circuit substantially prevent shoot-through current in the bridge circuit.

13. The switching circuit of claim 1, wherein:
the complementary inputs to the driver circuit are digital pulse width modulated signals.

14. The switching circuit of claim 1, wherein:
the driver circuit further comprises:
a pair of inverters to convert a first digital pulse width modulated signal into the complementary inputs of the driver circuit.

15. A switching circuit comprising:
three pairs of transistors with a first transistor of each pair electrically coupled in series with a second transistor of each pair,
wherein:
the first transistor of a first pair of the three pairs of transistors and the first transistor of a second pair of the three pairs of transistors are electrically coupled to a bias voltage;
the second transistor of the first pair of the three pairs of transistors is electrically coupled to a first input;
the second transistor of the second pair of the three pairs of transistors is electrically coupled to a second input;
a first high impendence node electrically couples the first transistor of the second pair of the three pairs of transistors to the first transistor of a third pair of the three pairs of transistors;
a first low impedance node is formed between the first transistor of the first pair of the three pairs of transistors and the second transistor of the first pair of the three pairs of transistors;
the first low impedance node is electrically coupled to the second transistor in the third pair of the three pairs of transistors; and
a first load-driving output node is formed between the first transistor of the third pair of the three pairs of transistors and the second transistor of the third pair of the three pairs of transistors.

16. The switching circuit of claim 15, further comprising:
a fourth pair of transistors with a first transistor of the fourth pair of transistors electrically coupled in series with a second transistor of the fourth pair of transistors,
wherein:
a second load-driving output node is located between the first transistor of the fourth pair of transistors and the second transistor of the fourth pair of transistors;
a second high impedance node electrically couples a first transistor of the fourth pair of transistors to the first transistor of the first pair of the three pairs of transistors;
a second low impedance node is formed between the first transistor of the second pair of the three pairs of transistors and the second transistor of the second pair of the three pairs of transistors; and
the second low impedance node is electrically coupled to the second transistor in the fourth pair of transistors.

17. The switching circuit of claim 16, wherein:
the fourth pair of transistors and the third pair of transistors of the three pairs of transistor form a bridge circuit.

18. The switching circuit of claim 15, further comprising:
an active load circuit electrically coupled to the first transistor of the first pair and the first transistor of the second pair of the three pairs of transistors.

* * * * *